United States Patent [19]
Moon et al.

[11] Patent Number: 5,131,509
[45] Date of Patent: Jul. 21, 1992

[54] DUAL BRAKE APPARATUS

[75] Inventors: Jae H. Moon; Jong D. Kwak; Jong K. Lee, all of Kyungki; Won K. Ahn, Seoul, all of Rep. of Korea

[73] Assignee: Samsung Electronics Co., Ltd., Kyungki, Rep. of Korea

[21] Appl. No.: 688,459

[22] Filed: Apr. 22, 1991

[30] Foreign Application Priority Data

May 29, 1990 [KR] Rep. of Korea .............. 90-7407

[51] Int. Cl.⁵ .............................................. F16D 51/00
[52] U.S. Cl. ................................. 188/77 R; 188/77 W; 192/80
[58] Field of Search ............ 188/26, 58, 77 R, 77 W, 188/82.6; 192/80

[56] References Cited

U.S. PATENT DOCUMENTS

| | | | |
|---|---|---|---|
| 890,672 | 6/1908 | Mackintosh | 192/80 |
| 4,197,927 | 4/1980 | Johannsen et al. | 188/77 R |

FOREIGN PATENT DOCUMENTS 0014630  2/1981  Japan .............................. 188/77 R Primary Examiner—Robert J. Oberleitner
Assistant Examiner—Chris Schwartz
Attorney, Agent, or Firm—Burns, Doane, Swecker & Mathis

[57] ABSTRACT

A band brake apparatus functions to brake a rotary drum, wherein the magnitude of the braking force is independent of the direction in which the drum rotates. The band brake apparatus comprises first and second brake bands situated next to one another and encircling a reversible rotary drum. Each band has an anchored end anchored to a casing, and a displaceable end. The displaceable ends of both bands are connected to a common actuating lever. One band encircles the drum clockwise from its displaceable end, whereas the other end encircles the drum counterclockwise from its displaceable end. Each band includes a hole through which an end of the band extends, in order to form a loop encircling the drum.

9 Claims, 4 Drawing Sheets

DUAL BRAKE APPARATUS

BACKGROUND OF THE INVENTION

1. Field of the Invention

The present invention relates to a band brake apparatus of a rotating machine and particularly to a dual band brake apparatus for stopping, or at least retarding, the motion of a rotating machine, such as a washing machine having a large capacity.

2. Description of the Prior Art

A conventional brake apparatus being used in the industrial field is provided with a single lever 30 and single band 20, as shown in the accompanying FIGS. 3 and 4. The flexible steel band 20 acts against the external surface of a cylindrical drum 10 through rotation of the operating lever 30 in a clockwise direction about a pivot 40.

If the drum 10 is rotating in a clockwise direction, the force applied to the lever 30 is less than would be the case if the drum 10 were instead rotating in the counterclockwise direction. With this lesser force, the braking application for stopping, or at least retarding, the clockwise motion of the drum is accomplished. Since an inertial force of rotation of the drum is converted into a friction force, the friction force is added to a braking force.

If the drum 10 is rotating in a counterclockwise direction, the direction of the friction force mentioned above is reversed. The braking application performed in this case requires more force than in the case of the clockwise drum rotation.

It is generally desirable that the braking action applied to a rotary drum be consistent. In the case where the drum is capable of rotation in only one direction, a consistent braking action can be achieved by a conventional braking mechanism depicted in FIGS. 3 and 4. However, for reasons explained above, consistent braking action cannot be achieved by such a braking mechanism in the case where the drum is reversible, i.e., when the drum is able to rotate in either direction.

In order to achieve a consistent braking force, regardless of the direction in which a reversible drum rotates, braking mechanisms of the types disclosed in Japanese Laid-Open Publication Nos. SHO 60-237230 and SHO 56-14630 have been proposed.

The band brake apparatus disclosed in Japanese Laid-Open Publication No. SHO 60-237230 includes a single flexible band lined with a friction material. The band encircles an external surface of a cylindrical drum, one band end being connected to one connecting shaft at the end of a drive lever, the other band end being connected to another connecting shaft at the end of the drive lever. The connecting shafts are interconnected by gears so that both shafts are rotated in response to rotation of the drive lever in such manner that both ends of the brake bands are pulled toward one another. The connecting shafts are normally pulled toward each other by a spring which yields in response to rotation of the drive lever in a brake-actuating direction.

The band brake apparatus disclosed in Japanese Laid-Open Publication No. SHO 56-14630 includes a single flexible band one end of which is attached to a first lever and another end of which is attached to a second lever. The band encircles the external surface of a cylindrical drum. A torsion spring engages the first and second levers to bias them outwardly. First and second stops are provided for restraining rotation of the second lever around a fixed shaft of the torsion spring within a predetermined range. A third stop is provided for restraining the rotation of the first lever around the small shaft of the operating lever, whereby the torsion of the torsion spring causes both ends of the band to move upwards against the rotating drum so as to brake the rotating drum.

The prior art apparatuses which require elements such as springs and gears, exhibit weaknesses in durability, higher manufacturing costs and complicated structure.

Furthermore, the prior art apparatuses have the problem of a shorter life cycle caused by damage of the elements.

An object of the present invention is to provide a band brake apparatus for solving the above problems.

SUMMARY OF THE INVENTION

The present invention involves a band brake apparatus for braking clockwise or counterclockwise rotation of a reversibly rotatable rotary member. The apparatus comprises a case and the rotary member positioned inside of the case. A first band member extends around a first surface portion of the rotary member for applying a friction force thereto. The first band member includes a first displaceable end. A second band member, which is situated axially adjacent the first band member, extends around a second surface portion of the rotary member for applying a friction force thereto. The second band member includes a second displaceable end. A common actuating member is secured to both of the first and second displaceable ends and is movable in a direction of actuation for applying a braking force to tension the first and second band members, so that friction forces are applied to the first and second surface portions of the rotary member. The first band member extends from the actuating member in a clockwise direction around the first surface portion. The second band member extends from the actuating member in a counterclockwise direction around the second surface portion.

As a result of such a structure, the magnitude of the braking force is independent of the direction of rotation of the rotary member.

Preferably, the actuating member is in the form of a pivotal lever, with the first and second displaceable ends being attached to fixedly interconnected arms of that lever.

Preferably, each band member includes an anchored end anchored to the case and a hole formed therein. The anchored end can be looped through the hole, whereby the band completely encircles the rotary member. Accordingly, the two band members cross each other as viewed in the axial direction. The two band members are mounted in generally symmetrical relationship as viewed axially.

BRIEF DESCRIPTION OF THE DRAWINGS

The objects and advantages of the invention will become apparent from the following detailed description of a preferred embodiment thereof in connection with the accompanying drawings, in which like numerals designate like elements, and in which.

DETAILED DESCRIPTION OF A PREFERRED EMBODIMENT OF THE INVENTION

Figure 2:
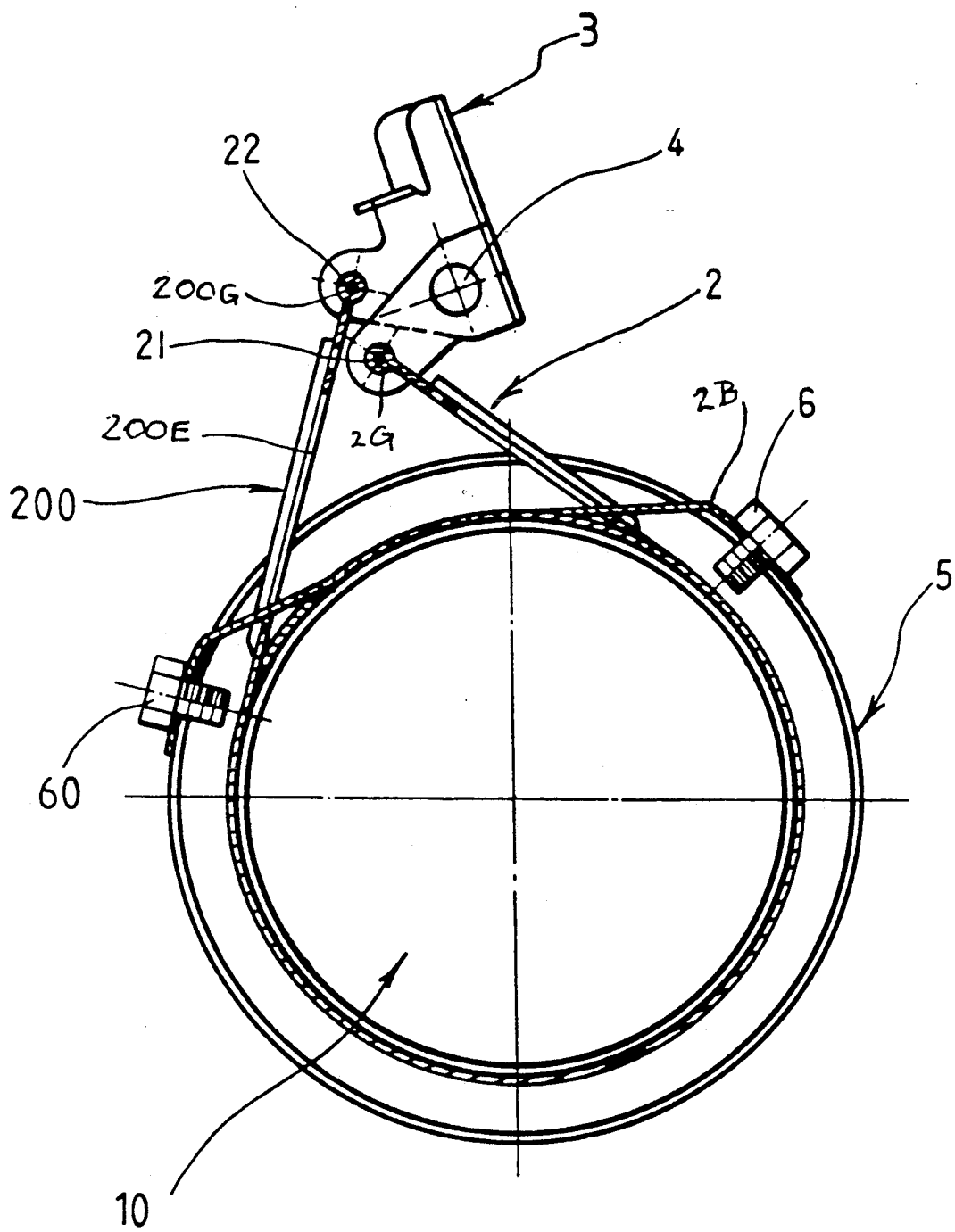
FIG. 2 is a cross-sectional view through a dual band brake apparatus in which two of the bands of FIG. 1 are assembled.
Figure 3:
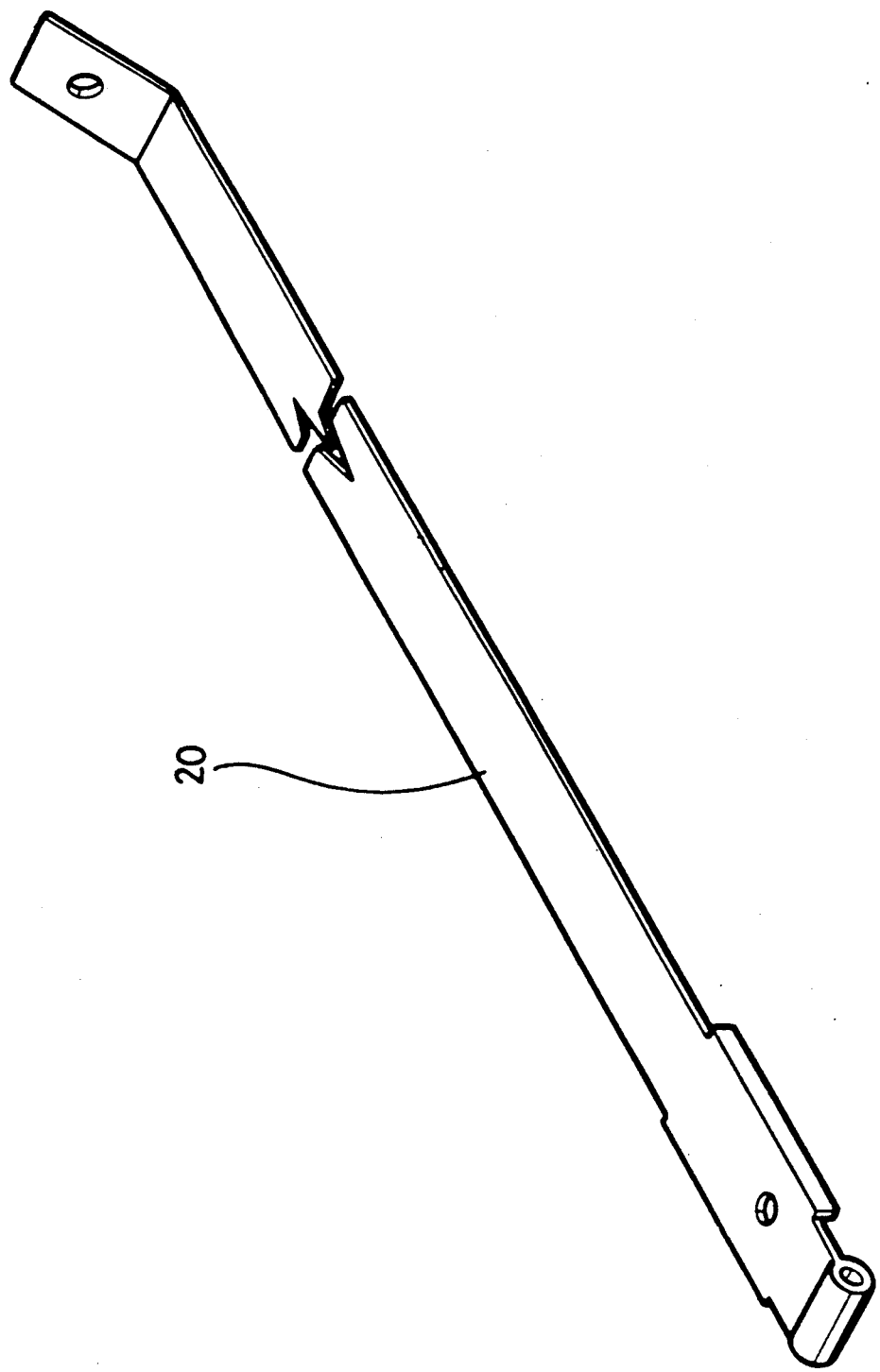
FIG. 3 is a view similar to FIG. 1 of a prior art brake band.
Figure 4:
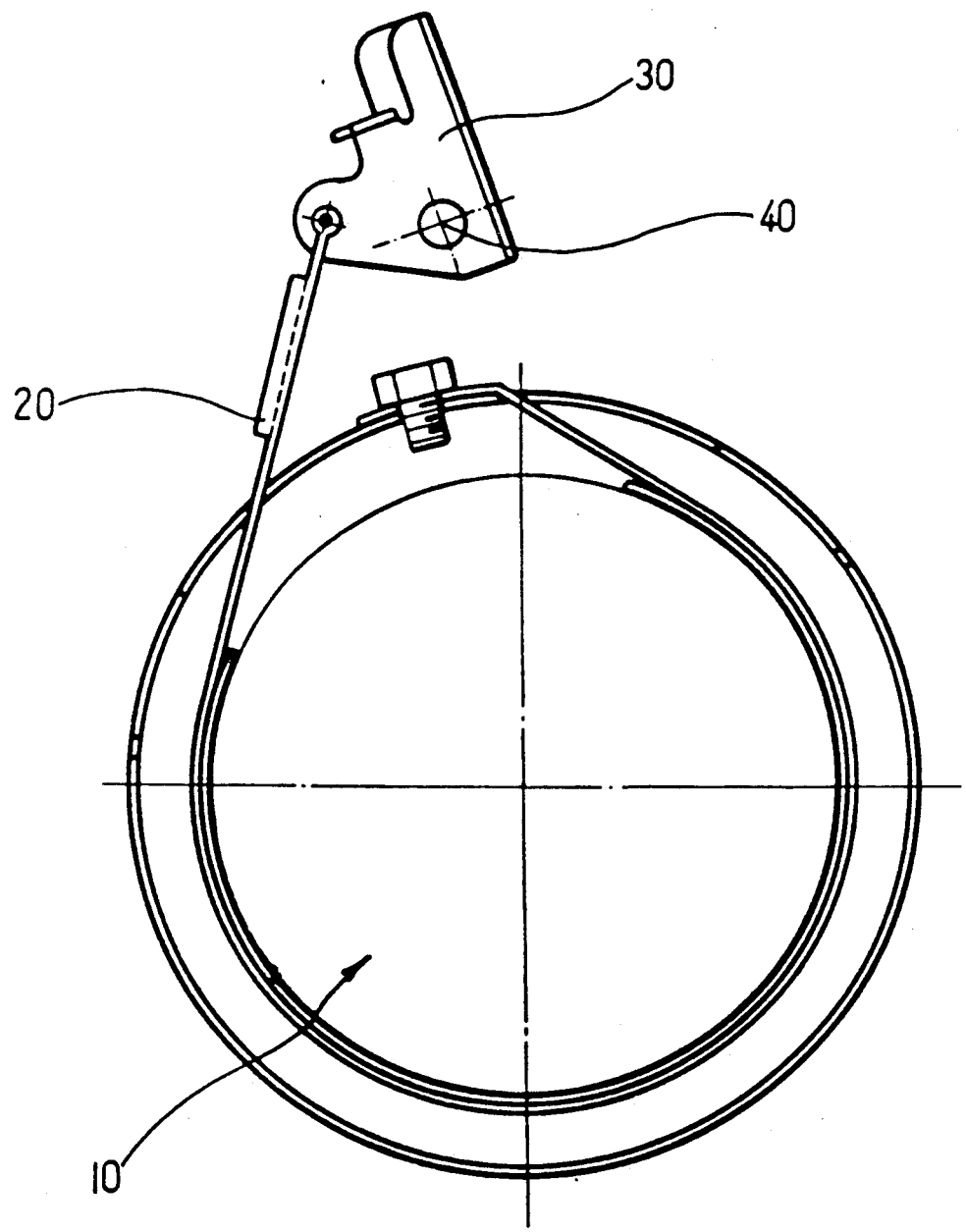
FIG. 4 is a view similar to FIG. 2 of a conventional band brake apparatus in which the band of FIG. 3 is mounted.

A braking mechanism depicted in FIG. 2 comprises a dual band brake arrangement comprising identical first and second brake bands 2, 200 which are actuated by a common operating lever 3.

Figure 1:
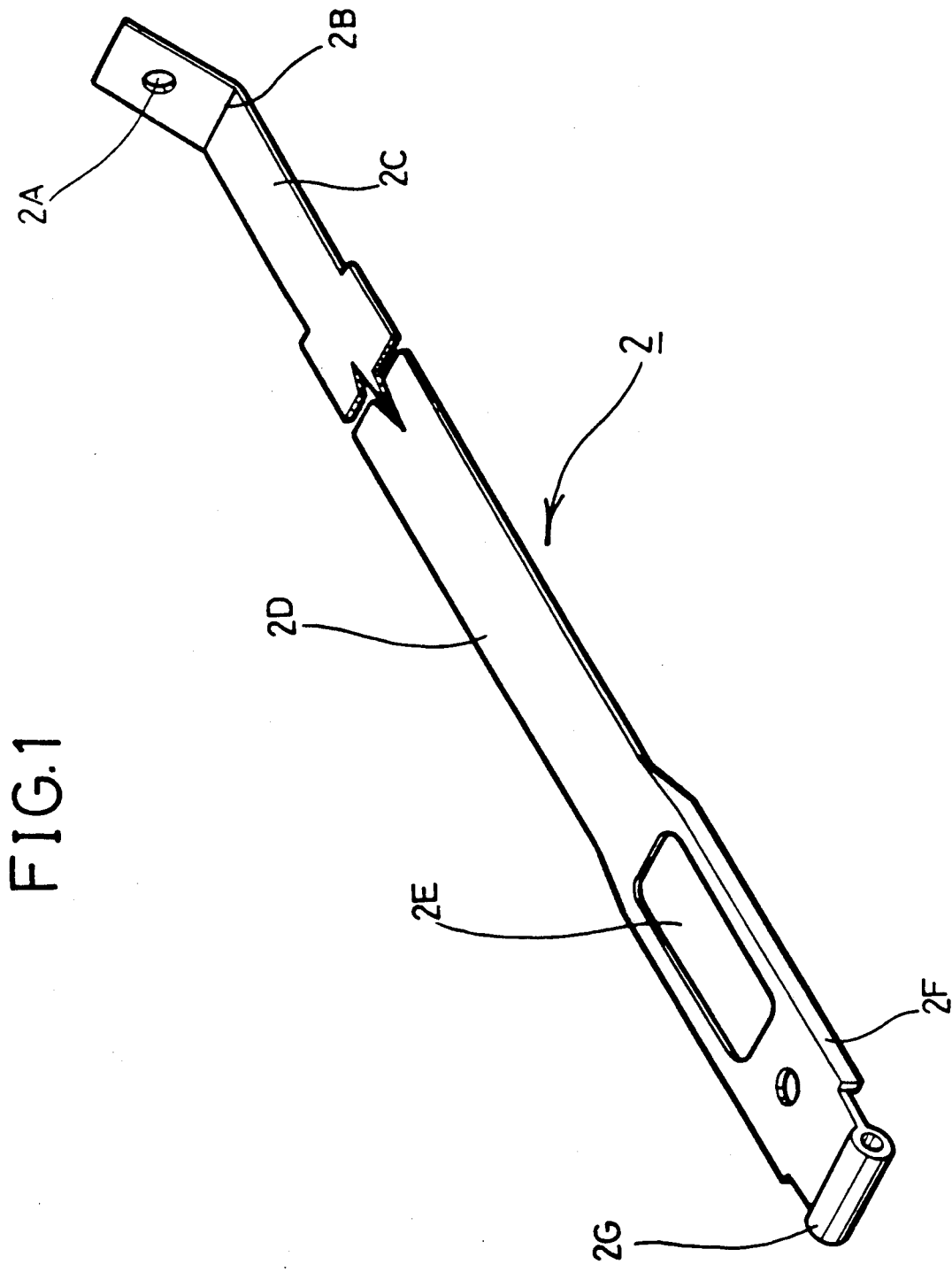
FIG. 1 is a perspective view of one brake band to be used in a dual band brake apparatus according to the invention.

First brake band 2 shown in FIG. 1 is formed as a flexible flat bar having a predetermined length. An aperture 2A is drilled at one end of the first brake band to enable the brake band 2 to be removably attached to the surface of a case 5 which encloses the drum. A bend line 2B is formed at a distance from the aperture 2A, followed by a small width portion 2C extended towards a wider brake band portion 2D. The brake band portion 2D is of a length suitable for encircling a considerable distance of the periphery of a rotary drum 1. A remaining length of the first brake band includes an oblong hole 2E therein having four rounded corners, and a shaft 2G.

To install the brake band 2 around the drum 10, as shown in FIG. 2, the band is wrapped around the drum, and the small width portion 2C is looped through the oblong hole 2E, the width of the hole 2E being wider than the small width portion 2C. The excess length of the hole 2E is formed for convenience in assembling the brake band. That is, the circumferential dimension of the hole is greater than the thickness of the band to enable the band to be easily inserted therethrough.

An area having the hole 2E in the flexible flat bar is made of sufficient width to form reinforcement flanges 2F along both sides for the purpose of the enhancement of tension.

The reinforcement flanges 2F are bent at an appropriate right angle along the longitudinal by means of a press to reduce the overall band width and enhance the miniaturization of the drum. The shaft 2G, forming a pivot hole therethrough, is formed integrally at the other end of the first band 2.

After the bent end of the band 2 has been looped through the hole 2E, that bent end defines an anchored end of the band by being removably anchored to a surface of the case 5 by a bolt 6 passing through the aperture 2A in the bent end of band 2. The band portion 2D encircles a portion of the peripheral surface of drum 10. The pivot shaft 2G, which forms a displaceable end of the band 2, is coupled to a connecting hole 21 in a first arm of an actuating lever 3 by means of a pivot pin.

The second brake band 200 is wrapped around the drum at a location alongside of (i.e., axially adjacent) the first band 2 and is removably anchored to the case 5 and the lever 3 in the same manner as the first band 2. That is, the bent end of the second band 200 is looped through an oblong hole 200E of the second band and removably anchored to the case 5 by a bolt 60. The other, displaceable end of the second band forms a shaft 200G which is pivotably connected by a pin to a hole 22 in a second arm of the lever 3.

It will be appreciated that the first band 2 extends around the drum in a first direction from the lever (e.g., clockwise as viewed in FIG. 2), and the second band 200 encircles the drum in a second, opposite direction from the lever 3 (e.g., counterclockwise as viewed in FIG. 2). When performing a braking operation, the lever 3 is rotated in the same direction (i.e., clockwise in FIG. 2), regardless of the direction of rotation of the reversible drum.

In operation, first assume that the drum 10 is rotating clockwise. When the lever 3 is rotated about axle 4 in its actuating direction, (i.e., clockwise in FIG. 2), both brake bands apply braking forces to the drum. However, the frictional forces created by the drum acting on the first band will exert a strong clockwise pull on the displaceable end 2G of the first band, tending to oppose the rotation of the lever 3. No such pull is exerted by the drum on the displaceable end 200G of the second band 200. If the rotation of the drum is reversed to a counterclockwise direction, both bands apply braking forces, and the drum applies a counterclockwise pull upon the displaceable end of the second band 200 tending to oppose the rotation of the lever. No such pull is applied by the drum to the displaceable end of the first band 2.

Therefore, it will be appreciated that similar braking actions occur, regardless of the direction in which the drum rotates. That is, for a given drum speed, the lever applies the same force to stop the drum from both clockwise and counterclockwise rotations. That is, in either case, both brake bands apply braking forces, and the direction of drum rotation is responsible for the generation of a friction force transmitted to the lever via one of the bands in a manner opposing the rotation of the lever. Hence, consistent braking forces are applied to a reversible drum 4.

The balanced braking action is accomplished without the use of gears, springs and multiple levers as used in the earlier discussed prior art. The braking mechanism is thus more simplified, stronger, and longer lasting.

While the invention has been described in terms of a preferred embodiment thereof, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. A band brake apparatus for braking both clockwise and counterclockwise rotations of a reversibly rotatable rotary member, comprising:

a case;

a reversibly rotatable rotary member positioned within said case;

first band means extending around a first surface portion of said rotary member for applying a friction force thereto, said first friction means including a first displaceable end;

second band means disposed axially adjacent said first band means and extending around a second surface portion of said rotary member for applying a friction force thereto, said second band means including a second displaceable end; and a movable actuating means common to both of said band means, said actuating means being secured to both of said first and second displaceable ends and being movable in a direction of actuation for applying a braking force to tension said first and second band means so that friction forces are applied to said first and second surface portions of said rotary member;

said first band means extending from said actuating means in a clockwise direction around said first surface portion, and said second band means extending from said actuating means in a counterclockwise direction around said second surface portion;

each of said band means having an anchored end situated opposite its displaceable end, said anchored end being anchored to said case;

said first band means including a first hole therein through which one end of said first band means extends, whereby said first band means forms a first loop extending around said rotary member, said second band means including a second hole therein through which one end of said second band means extends, whereby said second band means forms a second loop extending around said rotary member.

2. A brake apparatus according to claim 1, wherein said first and second holes are formed adjacent said displaceable ends of said first and second band means, respectively, said holes receiving said anchoring ends of said first and second band means, respectively.

3. A brake apparatus according to claim 1, wherein a portion of each of said band means in which said hole is formed is widened with respect to a remaining portion of said band means.

4. A brake apparatus according to claim 2, wherein each of said holes is longer in the circumferential direction than the thickness of the respective band means.

5. A brake apparatus according to claim 2, wherein each said band means is generally flat and includes drilled apertures t its anchored end for securement to said case, and includes a shaft at its displaceable end for pivotal connection to said movable actuating member.

6. A brake apparatus according to claim 2, wherein a portion of each band means in which said hole is formed is widened with respect to a remaining portion of the band means and is bordered by reinforcing flanges, each of said holes having a circumferential dimension which is greater than the thickness of the respective band means, said anchoring end of each band means being bent and including an aperture therein.

7. A brake apparatus according to claim 1, wherein said movable actuating means comprises a rotary lever.

8. A brake apparatus according to claim 7, wherein said lever has first and second rigidly interconnected arms, said displaceable ends of said first and second band means being connected to said first and second arms, respectively.

9. A band brake apparatus for braking both clockwise and counterclockwise rotations of a reversibly rotatable rotary member, comprising:

a case;

a reversibly rotatable rotary member positioned within said case;

first band means extending around a first surface portion of said rotary member for applying a friction force thereto, said first friction means including a first displaceable end;

second band means disposed axially adjacent said first band means and extending around a second surface portion of said rotary member for applying a friction force thereto, said second band means including a second displaceable end; and a movable actuating means common to both of said band means, said actuating means being secured to both of said first and second displaceable ends and being movable in a direction of actuation for applying a braking force to tension said first and second band means so that friction forces are applied to said first and second surface portions of said rotary member;

said first band means extending from said actuating means in a clockwise direction around said first surface portion, and said second band means extending from said actuating means in a counterclockwise direction around said second surface portion;

said movable actuating means comprises a rotary lever having first and second rigidly interconnected arms, said displaceable ends of said first and second band means being connected to said first and second arms, respectively.

* * * * *